Dec. 6, 1960    W. R. CARNES ET AL    2,962,730
UNIVERSAL INVALID HANDLING DEVICE
Filed May 19, 1958    5 Sheets-Sheet 2
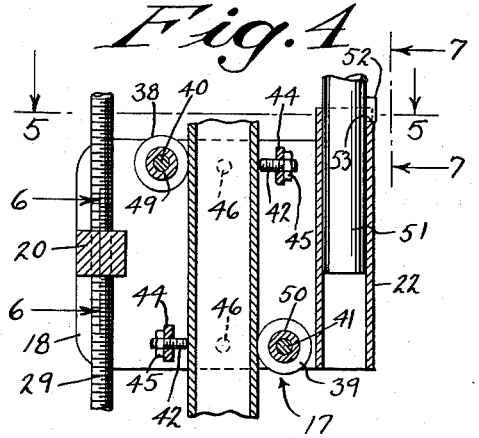
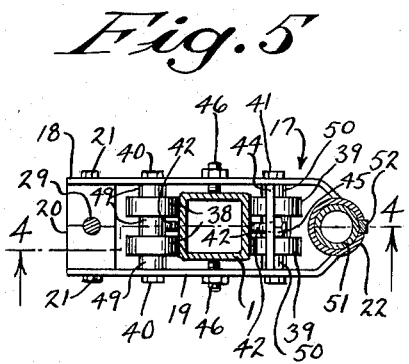
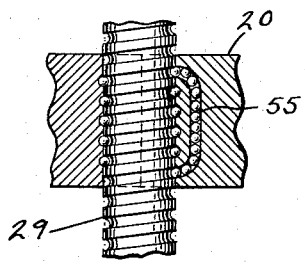
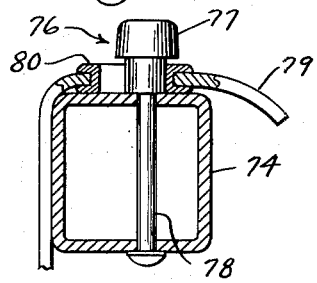
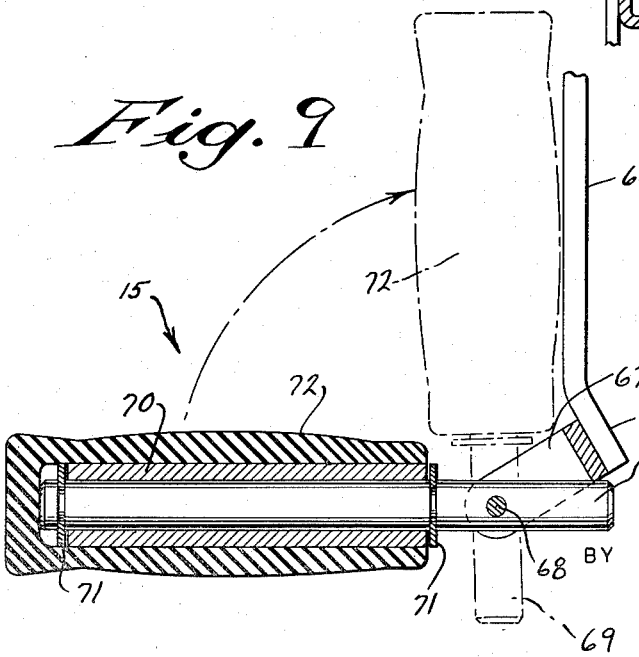
INVENTORS
WILBUR R. CARNES
ROBERT J. TROLLER
BY Quarles, Fox, Seidel,
Bateman & Hoar
ATTORNEYS Dec. 6, 1960 W. R. CARNES ET AL 2,962,730
UNIVERSAL INVALID HANDLING DEVICE
Filed May 19, 1958 5 Sheets-Sheet 3
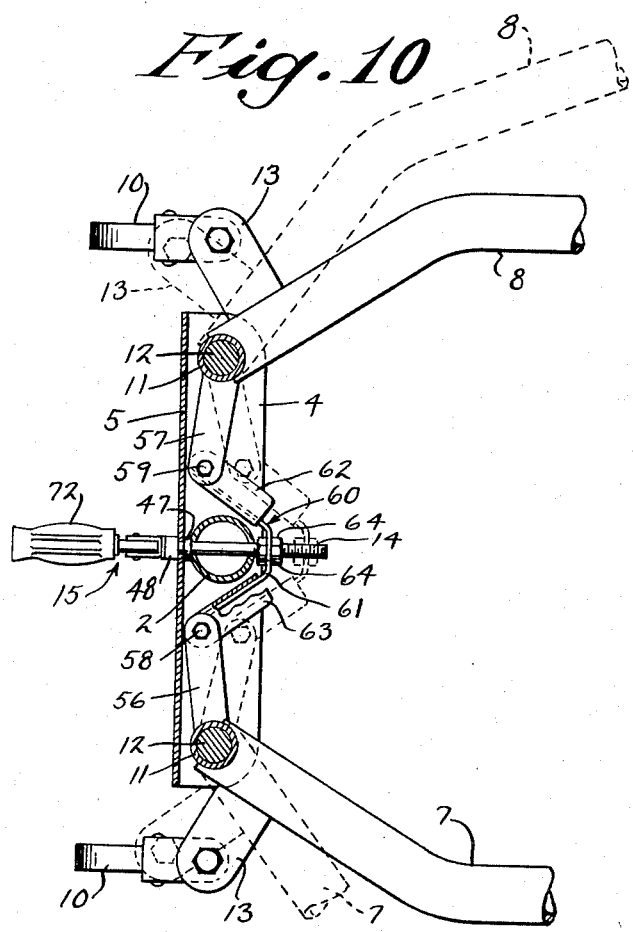
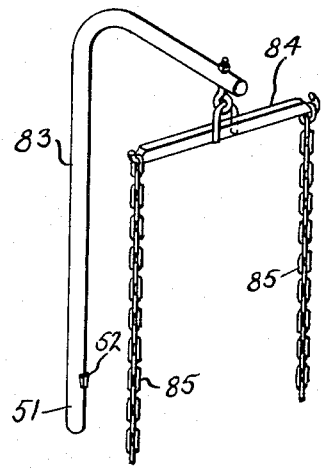
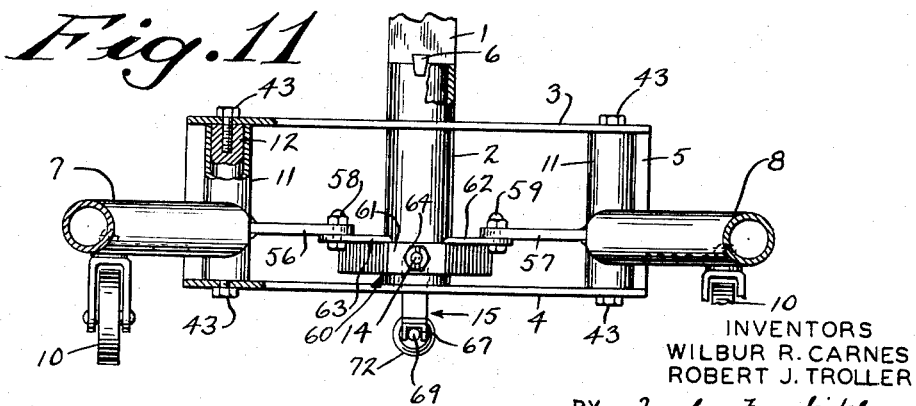
INVENTORS
WILBUR R. CARNES
ROBERT J. TROLLER
ATTORNEYS

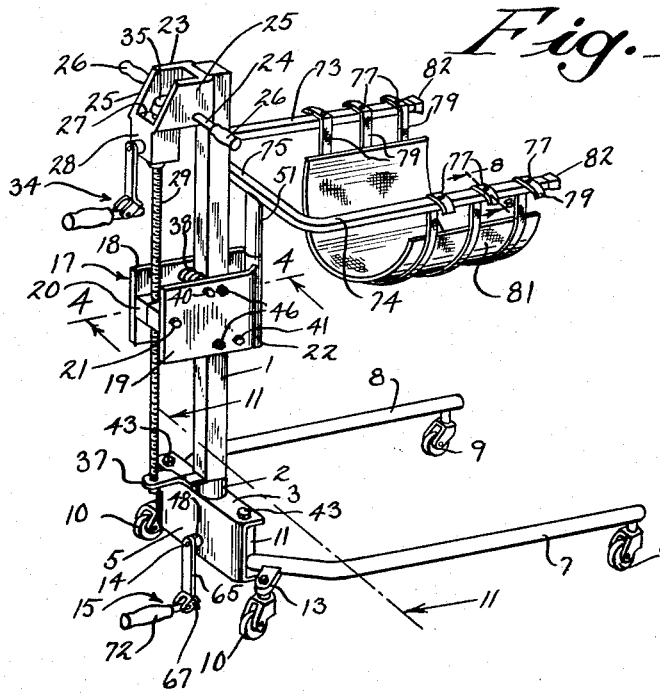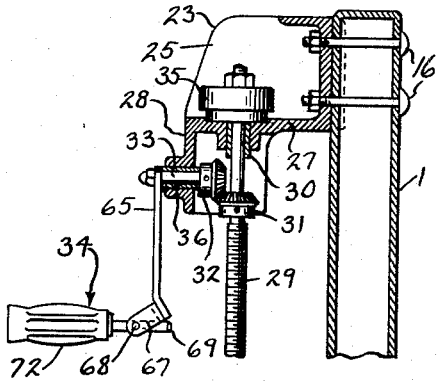

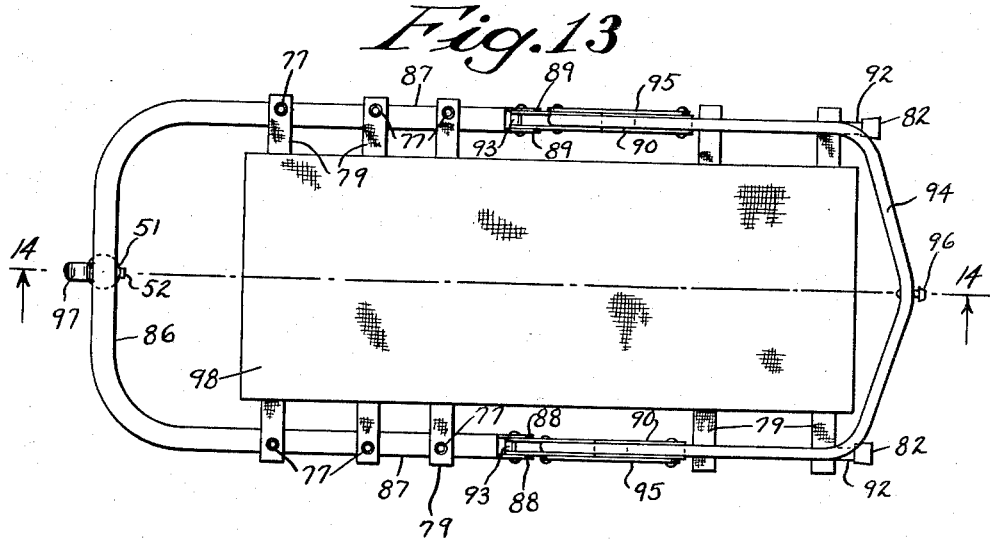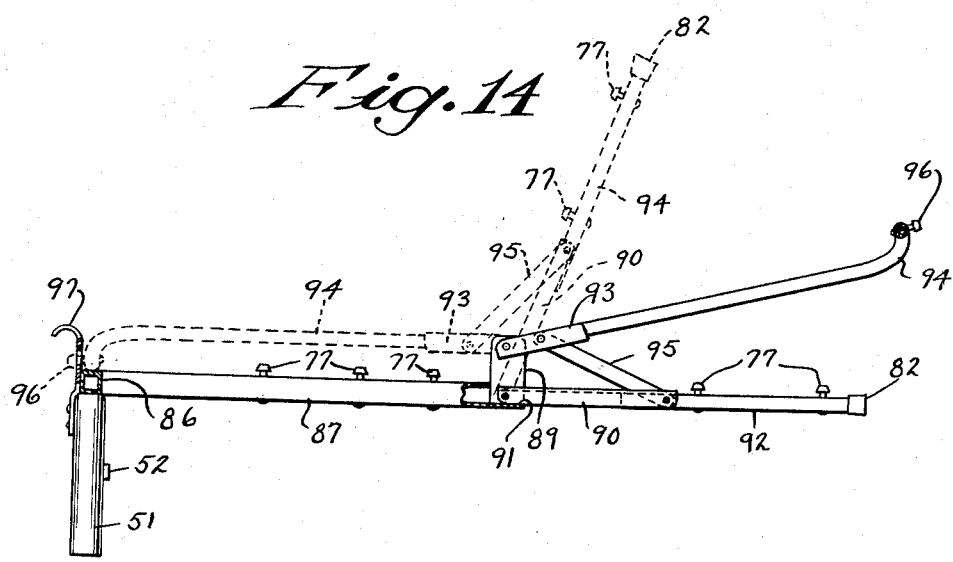

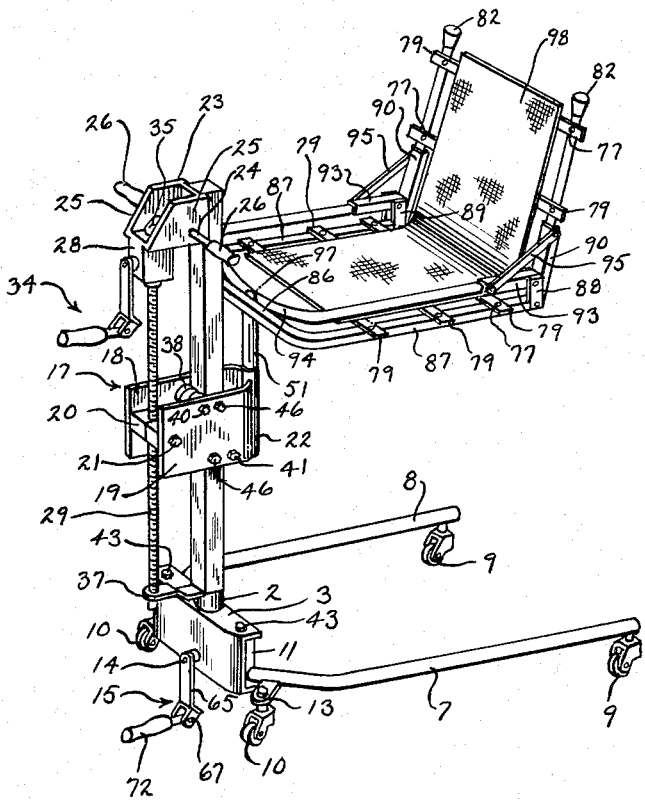

2,962,730

UNIVERSAL INVALID HANDLING DEVICE

Wilbur R. Carnes and Robert J. Troller, Madison, Wis., assignors to Coolant Equipment Corporation, Verona, Wis., a corporation of Wisconsin Filed May 19, 1958, Ser. No. 736,185

6 Claims. (Cl. 5—86)

This invention relates to invalid handling mechanisms and more specifically resides in a universal invalid handling device having a vertical standard secured at its base to a pair of forwardly extending laterally adjustable support arms which are fitted with rotatable floor support means at their undersides, and further having a vertically adjustable carriage slidably mounted on the standard and which carriage is adapted to support a patient seat, sling, or stretcher, said stretcher being arranged for alternatively elevating and lowering a patient reposed therein in either a sitting or a reclining position. The handling device may thus be readily adapted for handling and transportation of an invalid from a bed to a chair or to another bed or the like.

In hosiptals and other institutions as well as in private homes the handling of bedridden patients has constantly been a problem for those to whom the care of the patients is charged. Frequently, attendants have been required to manually carry patients from one bed to another or from a bed to a chair or the like without the aid of mechanical conveyances to reduce the amount of physical exertion involved. In other instances, mechanical devices have been utilized; however, due to space restrictions limiting the use of bulky devices, and limitations on the extent of patient movement afforded by the devices themselves, such means have not been entirely adequate to eliminate the need for additional burdensome lifting by the attendants.

Certain prior art devices intended for use in handling invalid patients were constructed with structural members projecting toward the head and shoulders of the supported patient. Such devices are impractical for many applications due to the constant danger of physical harm being inflicted to a patient through contact with such projections. Devices of this nature are also objectionable since the presence of structural members so positioned near the patient frequently resulted in a psychological rebellion on the part of the patient toward the use of the device. This is especially true when the patient is supported by a chain suspended sling seat, permitting him to swing from side to side on slight movement of the device. Further, prior art machines were often too complicated to be efficiently handled by an unskilled attendant which drastically hindered effective utilization of the machines.

Mechanical contrivances which are adapted for institutional use must necessarily be free of objectionable rattles, squeaks and other disturbing noises. A prevailing criticism of various prior art machines is that they included assemblies of loosely fitting metallic parts which caused such objectionable disturbances as to render the machines unfit for use in connection with sickrooms.

This invention is constructed to overcome the deficiencies in the prior art. Lateral adjustment of the floor support arms has been accomplished through the use of an integrally formed movable toggle member having resilient flexible extensions which are joined to the support arms. This has the important advantages of holding the support arms under spring tension when the support arms are adjusted to any desired position, thereby eliminating the possibility of rattles between the linking members. Such construction has a further advantage in that the entire adjustment mechanism may be suitably placed near the pivoted ends of the support arms so as to permit the free ends of the arms to extend forwardly therefrom unobstructed by structure disposed between the arms. Vertical movement of the patient support carriage has been provided through the use of noise-reducing roller members and auxiliary guide pads adapted to ride the sides of an upright standard, while adjustment of the carriage is accomplished by imparting motion to a rotatably mounted threaded screw which is received by a noiseless thread follower, of a ball bearing type, secured to the carriage.

Various types of patient supports may be attached to the carriage and supported thereby. In some instances it may be desirable to use a sling arrangement or a simple web seat for purposes of supporting the patient in a sitting position. Frequently, however, it may be necessary to receive the patient in a prone position on a convertible stretcher as provided. Thereafter, the stretcher may be converted into a seat arrangement whereupon the patient is simultaneously moved into a sitting position. This facilitates the removal of a seriously handicapped patient from a bed to a chair, toilet and the like.

It is an object of this invention to provide a universal invalid handling apparatus adapted to perform all types of lifting and transporting functions associated with the handling of invalid patients.

Another object of this invention is to provide a universal invalid handling apparatus in which the likelihood of mechanical rattles, frictional squeaks, and other disturbing noise is essentially eliminated.

Another object of this invention is to provide an apparatus for transporting invalids having laterally extending floor support arms which may be quickly and efficiently adjusted away from one another for purposes of straddling a chair or other ground supported object, and adjusted toward one another to permit the apparatus to be moved through a narrow doorway or other limited passageway.

It is another object of this invention to provide an apparatus for handling invalids in which projecting adjustment handles may be conveniently folded out of the way.

It is another object of this invention to provide an invalid moving device which may be used to lift and transport patients either in a reclining or sitting position.

It is another object of the present invention to provide an apparatus which may be used to receive patients in a reclining position, and which may thereafter be simply adjusted to move the patient into a sitting position.

It is a further object of this invention to provide an apparatus having no dangerous and unsightly portions of structure projecting in the direction of the patient above the patient's support.

A further object of the present invention is to provide an apparatus for handling invalid patients which is useful for moving the patient into various positions without excessive exertion on the part of the attendant.

These and other objects and advantages of the invention will appear from the following description together with the drawings which form a part hereof. The drawings are for purposes of illustration and are not to be construed as defining the scope or limits of the invention, reference being had for the latter purpose to the appended claims.

In the drawings:

Fig. 1 is a perspective view of one embodiment of the invention in which the patient support is a seat, Fig. 2 is a top plan view of the upper portion of the apparatus shown in Fig. 1, and including the vertical standard and upper attachments therewith, Fig. 3 is a sectional view of the portion of the apparatus shown in Fig. 2 taken along the sectional plane indicated by line 3—3 in Fig. 2, Fig. 4 is a fragmentary sectional view of a vertically adjustable carriage means forming a portion of the apparatus taken along a sectional plane indicated by line 4—4 in Fig. 1, and Fig. 5, Fig. 5 is a sectional view of the carriage means taken along the sectional plane indicated by line 5—5 in Fig. 4, Fig. 6 is a sectional view of a thread follower taken along the sectional plane indicated by line 6—6 in Fig. 4, Fig. 7 is an elevational view of a portion of a patient support attachment apparatus when viewed as indicated by the directional arrows 7—7 in Fig. 4, Fig. 8 is a sectional view of a patient support arm taken along the sectional plane indicated by line 8—8 in Fig. 1, Fig. 9 is an elevational view of an adjustment handle employed in the apparatus, Fig. 10 is a plan view of the base of the apparatus shown in Fig. 1 with the upper portion of the apparatus removed, Fig. 11 is a front elevational view of the base of the apparatus shown in Fig. 10 with a portion of the upright standard connected thereto, Fig. 12 is a perspective view of a patient sling support adapted for attachment with the carriage means shown in Fig. 4, Fig. 13 is a top plan view of a combination chair and stretcher adapted for attachment with the carriage means shown in Fig. 4, Fig. 14 is a sectional view of the combination chair and stretcher illustrated in Fig. 13 taken along the sectional plane indicated by line 14—14 in Fig. 13 and with the supporting mat removed, and Fig. 15 is a perspective view of the carriage means arranged for support of the combination chair and stretcher embodiment disclosed in Figs. 13 and 14.

Referring now to the drawings, there is shown in Fig. 1 an upright standard 1 having a rectangular cross section throughout its upper portion and a turned end of circular cross section at its base which forms the main supporting column for the apparatus. At its lower end the standard 1 is fitted into a collar 2 which is fixed between sides 3 and 4 of a channel base member 5 and extends upwardly through side 3, as illustrated in detail in Figs. 10 and 11. A protruding locking lug 6 (see Fig. 11) attached to the standard 1 is adapted to seat in a notch in the collar 2 to prevent rotation of the standard 1 within the collar 2. The base member 5 extends equidistantly from both sides of collar 2 and pivotally supports, at its extremities, a pair of tubular leg rails 7 and 8 formed so as to extend outwardly and forwardly from the base member 5. Floor contacting rollers in the form of casters 9 are fitted at the forward ends thereof and similar casters 10 are carried by protruding ears 13 attached to the leg rails 7 and 8 near the base member 5. With specific reference to Fig. 11, the leg rails 7 and 8 are formed with vertical sleeves 11 at their rearward ends into which are inserted vertical pins 12 that are in turn retained between sides 3 and 4 of base member 5 by cap screws 43.

The adjustment linkage for the leg rails 7 and 8 is best illustrated in Figs. 10 and 11 where there is shown to be directed inwardly from the pivoted ends of the leg rails 7 and 8 linking bars 56 and 57 which are welded to the leg rails 7 and 8. The linking bars 56 and 57 are pivotally joined to an integrally formed toggle member 60 which includes a flat spring member 61 disposed on its side and formed to extend angularly rearwardly at either end where it is secured to rigid angle members 62 and 63. The members 62 and 63 are pivotally connected by bolt and nut assemblies 58 and 59 to the linking bars 56 and 57 and are of a suitable length to properly position the leg rails 4 and 5. The flat spring member 61 of the toggle member 60 has a threaded nut 64 secured thereto intermediate its ends and adapted to be received by a threaded terminal portion of a rotatable shaft 14 which extends rearwardly through the collar 2 and base member 5 for connection with an adjustment crank 15 which will be more fully described hereinafter. The shaft 14 is restrained from axial displacement by collars 47 and 48 positioned thereon at either side of the base member 5 as shown in Fig. 10. It may be seen that when the shaft 14 is rotated by the adjustment crank 15, the threaded nut 64 and attached toggle member 60 are caused to move forwardly or rearwardly according to the direction of rotation of shaft 14. Particularly, when the nut 64 and toggle member 60 are caused to move forwardly from the heavy line position to the phantom position illustrated in Fig. 10, the rigid angle members 62 and 63 transmit the forward motion to the linking bars 56 and 57 which operate to pivotally swing the leg rails 7 and 8 outwardly to the phantom position shown. During this operation it may be observed that the toggle member 60 is subjected to bending stresses which are yielded to by the flat spring member 61.

A movable carriage 17 including a pair of flat plates 18 and 19 disposed on either side of the upright standard 1, as illustrated in Figs. 1, 4 and 5, are preferably arranged to extend both forwardly and rearwardly of the standard 1. A thread follower 20 is mounted between the rearward extensions of plates 18 and 19 by bolt means 21.

The thread follower 20 may be one of various types, however, for quiet and dependable operation it has been found desirable to employ a helical ball bearing race assembly as shown in detail in Fig. 6 which is known in the prior art. The assembly is arranged to return the spherical bearings from one end of the race to the other during operation, as shown by the return channel designated by the numeral 55.

At their forward extensions, plates 18 and 19 support by means of welding or like attachment an upright tubular receptacle 22, shown in Figs. 1, 4 and 5, and which is adapted to receive an attachment end 51 of the various types of patient supports hereinafter described. As shown in Fig. 7, a stop lug 52 is suitably positioned on and secured to the attachment end 51 and is adapted to be received by a notch 53 in the receptacle 22, whereby the lug 52 and the notch 53 may interact to prevent rotation of the attachment end 51 and to limit the depth of insertion of the attachment end 51 into the receptacle 22.

Also supported between the plates 18 and 19 are a pair of dual rollers 38 and 39 rotatably mounted at the upper rearward and lower forward portions of the extension of plates 18 and 19, as illustrated in Figs. 4 and 5. These rollers 38 and 39 act as bearing surfaces for the movable carriage 17 and are rotatably supported by bolt shafts 40 and 41 which extend between plates 18 and 19. Suitable spacing collars 49 and 50 are utilized to dispose the dual rollers 38 and 39 in working relationship with the standard 1. Positioned on opposite sides of the standard 1 from the rollers 38 and 39 are stabilizers 42 and 43 which are threaded into bridging bars 44 secured between the plates 18 and 19. The stabilizers 42 and 43 are preferably of nylon or similar resilient material and are adapted to be in contacting engagement with the standard 1 for the purpose of holding the rollers 38 and 39 in continuous rotating engagement with the standard 1. Lock nuts 45 are utilized to hold the stabilizers 42 and 43 in proper adjustment. In Figs. 1 and 5 it may be seen that stabilizers 46 of similar construction are utilized as contacting members on opposed sides of the standard 1 which are parallel with plates 18 and 19, and are fitted in threaded apertures in plates 18 and 19 in a similar manner to that in which stabilizers 42 and 43 are supported by bridging bars 44.

It will be apparent that, when desired, as in the case of manufacturing relatively less expensive models and where expandible leg rails are not required, rigid leg rails may be provided (not shown). In such construction a simple integral U-shape construction will suffice with a base similar to the base member 5 being provided for attachment with the standard 1, and having rails similar to rails 7 and 8 rigidly affixed to the base member by means of welding or the like.

At the upper end of the standard 1, an open bracket 23 is secured to the standard 1 by bolts 16, as shown in Fig. 3. The bracket 23 supports laterally extending handle bars 24 which are rigidly secured to opposed sides 25 of the bracket 23. Rubber handle grips 26 are shown to be inserted over the ends of the handle bars 24. A base 27 of the bracket 23 supports a gear box 28 which is positioned at the underside of the base 27, and extending downwardly through the base 27 and through the gear box 28 is an adjustment shaft 29 which is journaled in a bearing 30 carried by the base 27, as shown in Fig. 3. Inside the gear box 28, a bevel gear 31 is secured to the shaft 29 and positioned for engagement with a second bevel gear 32 carried by a right angle shaft 33 journaled in a bushing 36 in the gear box 28. Attached to and arranged to rotate shaft 33 is a crank 34 which is similar to the adjustment crank 15 adapted for operation of the leg rails 7 and 8, the details of which will be hereinafter described.

Mounted at the upper end of the shaft 29 immediately above the base 27 of the bracket 23 is a brake 35 suitably secured to the shaft 29. The brake 35 may be any one of a number of suitable brakes which are old in the art, for example, it may be of a frictional plate type having a constantly applied braking effect, or it may be of a ratchet type which will engage to apply an increased braking effect when the shaft 29 is rotated in a particular direction.

The adjustment shaft 29 is rotatably supported at its lower end by a suitable apertured bracket 37 welded at one end to the collar 2 and extending rearwardly thereof. Intermediate the bevel gear 31 and its connection with bracket 37, the shaft 29 is suitably threaded and adapted for engagement with the thread follower 20 as hereinbefore described, and shown in Figs. 4, 5 and 6.

It may be observed that when the crank 34 is rotated, the rotational movement is transferred at right angles through the bevel gears 32 and 31 to the adjustment shaft 29 which is restrained from axial displacement by the bracket 37 as well as by the brake 35 in contact with the base 27. Hence when the shaft 29 is rotated, the thread follower 20 is caused to move accordingly thereby raising or lowering the movable carriage 20 and the patient support means attached thereto.

As has been indicated previously, the adjustment crank 15 is constructed similarly as crank 34, an illustration of crank 15 appearing at Fig. 9. It may be seen that a crank arm 65 is formed with an angularly displaced terminal end 66 from which there extends perpendicularly a bifurcated member 67. The member 67 is welded to the terminal end 66 and carries at its outer end a riveted pin 68 which pivotally supports a handle rod 69. Concentrically mounted on the handle rod 69 and adapted to rotate thereon is a revolvable sleeve 70 which is restrained from axial displacement by expandible washers 71 which are compressed into circumferential slots in the handle rod 69 at either end of the sleeve 70. A tight fitting handle grip 72 which may be of the type used on bicycle handle bars is inserted over the sleeve 70.

Referring again to Fig. 1, the portion of the apparatus in that drawing devoted to the support of the patient is shown to consist of a pair of forwardly extending arms 73 and 74 which are connected at their rearward ends by a cross member 75. Preferably, the forwardly extending arms 73 and 74 and the cross member 75 are of one piece bended construction in which the material is conduit having a rectangular cross section and which is sufficiently rigid to withstand relatively high bending moments. Protector caps 82 of rubber or similar material may be inserted over the protruding exposed ends of the arms 73 and 74. To the center of the cross member 75 there is secured a downwardly directed attachment end 51 as hereinbefore described. Distributed at spaced intervals along the arms 73 and 74 are keepers 76 which are shown in detail in Fig. 8. The keepers 76 consist of a knob 77 supported by a bolt 78 which extends through the arm 74 and threadably engages the knob 77. Supported by the keepers 76 are straps 79 preferably of fabric or other flexible material and fitted with suitable grommets 80 that are adapted to fit over the keepers 76 to retain the straps 79. At their other ends the straps 79 are secured to the marginal areas of a rectangular mat 81, which may be of canvas or other flexible material capable of supporting the weight of a patient. It may be seen that the mat 81 may be placed under the patient as an initial step to loading the patient. Subsequently, the straps 79 may be drawn to the arms 73 and 74 and secured to the knobs 77.

In Fig. 12 there is illustrated an alternative type of patient support in the form of a patient sling having an attachment end 51 capable of being received by the receptacle 22 in a manner as hereinbefore described. Extending upwardly from the attachment end 51 is a support member 83 which may be of any desired height. The support member 83 is extended forward at its upper end as a cantilever and supports a crossbar 84 and drop chains 85, which chains may be used to suspend a suitable sling seat not shown.

In Figs. 13 and 14 there is illustrated a convertible stretcher-chair combination having a downwardly directed attachment end 51 also adapted for engagement with the receptacle 22. The attachment end 51 is preferably secured to the center of a cross member 86 which has forwardly directed member 87 attached to the extremities thereof to form a U-shaped construction. Preferably, the cross member 86 and member 87 may consist of conduit having a rectangular cross section which is capable of sustaining high bending stresses. Near the free end of each member 87 vertically disposed trunnion members 88 and 89 are secured to opposed sides thereof. Pivotally secured between the trunnion members 88 and 89 and directed outwardly in line with the member 87 are channels 90 which open downwardly and are limited in their downward travel by stops 91 comprised of forwardly extended portions of the under surfaces of members 87. Further extending in line with the members 87 are circular conduit members 92 which are pivotally joined near their ends between the sides of channels 90. Also pivotally connected between the members 88 and 89 at points above the channels 90 are relatively short lengths of channel members 93 which open upwardly and have secured within their free ends opposed arms of a substantially U-shaped circular conduit frame 94. Joined by pivot connections between the short channels 93 and the forward pivot points of channels 90 on the outward side of both members are linkage bars 95 which are adapted to cause the channels 90 and associated conduit members 92 to rotate upwardly in response to counterclockwise rotation of the conduit frame 94, as shown in Fig. 14. The center of the forward portion of the frame 94 is fitted with a protruding lug 96 which is adapted to be engaged by a flexible spring locking catch 97 when the conduit frame is rotated through approximately 180 degrees to a position shown in phantom in Fig. 14. In this position, the channels 90 and associated conduit members 92 are rotated into a position approximately 75 degrees from the horizontal. Spaced along the members 87 and 92 are knobs 77 as shown in Fig. 8, and heretofore described, which are adapted to retain grommeted straps 79 secured to and extending from marginal areas of a suitable stretcher mat 98 as shown in Fig. 13. This construction is similar to that described in connection with the seat support shown in Fig. 1. Thus it may be seen that when this convertible combination is disposed in extended form as shown in Figs. 13 and 14 it may function as a stretcher, however, when the frame 94 is rotated rearwardly, or counter-clockwise to the phantom position in Fig. 14, the apparatus is converted into a patient supporting chair.

The described construction of the convertible stretcher-chair combination of Figs. 13 and 14 permits relative ease in raising or elevating an invalid from prone to sitting position by means of the interlinking leverage members. The elevating operation may be performed by a relatively small statured person without undue lifting strain. Another feature of the present construction lies in the arrangement of support members which permits the opposed sides of the U-frame 94 to become convenient gripping handles for a transported patient, obviously contributing to his feeling of security in a relatively rigidly constructed device, contrasted with the usual sling supported seat such as that illustrated in Fig. 12. The practical use of the sling of Fig. 12 lies in temporarily supporting patients for lowering into bathtubs, swimming pools or hydrotherapeutic tanks and the like. However, for extended transporting or "sit up" periods the relatively rigid construction of the support members of Fig. 1 and Figs. 13–14 is obviously desirable.

It is also to be noted that the chair position shown in phantom in Fig. 14 provides a back rest construction without the usual prior art obstructions caused by pantograph type elevating linkages positioned at chin or head level of the transported patient. The construction is free of encumbrances and provides a rigid, secure support. It will be apparent that where desired an extension for a headrest (not shown) or other purpose may be provided by the use of an extended cross member protruding from the conduit members 92 when the caps 82, which are protectors for exposed ends of the conduit, are removed.

It is to be observed that the device herein described is capable of supporting patients in a multiplicity of positions by various support means. In particular, either the chair support illustrated in Fig. 1 or the sling arrangement may be employed to lift and transport a patient in a sitting position, whereas the convertible stretcher-chair illustrated in Figs. 13 and 14 may be advantageously utilized where a patient must necessarily remain in a reclining position or is incapable of being moved into a sitting position for loading in a seat type support. According to the dictates of the situation, the stretcher may be converted into a chair after the patient is loaded.

It will also be apparent that the present device lends further universality to invalid support means by being of "knockdown" construction permitting separation of the various components into the base 5 and extending leg rails 7 and 8 as one unit, the vertical standard 1 and its various attachments as a second unit separable from the base 5 at the collar 2 and the bracket 37, and thirdly the patient support means (in any of its several embodiments) separable at the removable attachment end 51 and the receptacle 22. The several separated units may be readily transported in "knockdown" relation in a conventional automobile, or may be conveniently stored in such condition under a conventional household or hospital bed for later assembly and use.

We claim:

1. In an invalid handling device comprising an upright standard; a base member arranged to extend in laterally opposed directions from one end of said standard; a pair of forwardly extending rails each being separately pivotally supported by said base member and adapted for angular relative movement in a plane substantially perpendicular to said standard; the combination with a laterally movable toggle member having a center portion provided with a threaded aperture and angularly directed flexible extensions integral therewith, said member being disposed between and pivotally joined at its extensions with said forwardly extending rails for overcenter movement thereof and having its center portion disposed forwardly of said base member; a screw rotatably supported and restrained from axial movement by said base member and engageable with said threaded aperture; an operating handle arranged to extend rearwardly of said base member for rotating said screw to pivotally actuate said rails for opposed relative movement of the free ends thereof; movable carriage means in slidably supporting relationship with said standard intermediate the ends thereof; an attachment receptacle supported by said carriage means; height adjusting means operably associated with said carriage means; bearing members disposed between and supported by said plates and arranged for bearing contact with opposed sides of said standard; and an invalid support comprising forwardly extending support means secured at one end to a rigid attachment and adapted for releasable engagement with said receptacle.

2. In an invalid handling device comprising an upright standard; a base member arranged to extend in laterally opposed directions from one end of said standard; a pair of forwardly extending rails each being separately pivotally supported by said base member and adapted for angular relative movement in a plane substantially perpendicular to said standard, the combination with an attachment ear for each of said rails secured adjacent to a respective pivot support; a laterally movable toggle member having a center portion provided with a threaded aperture and angularly directed flexible extensions integral therewith, said member being disposed between and pivotally joined at its extensions to the free ends of said attachment ears for overcenter movement thereof and having its center portion disposed forwardly of said base member; a screw rotatably supported and restrained from axial movement by said base member and engageable with said threaded aperture; an operating handle arranged to extend rearwardly of said base member for rotating said screw to pivotally actuate said rails for opposed relative movement of the free ends thereof; movable carriage means in slidably supporting relationship with said upright standard intermediate the ends thereof; an attachment receptacle supported by said carriage means; height adjusting means operably associated with said movable carriage means; and an invalid support comprising forwardly extending support means secured at one end to a rigid attachment and adapted for releasable engagement with said receptacle.

3. In an invalid handling device comprising an upright standard; a base member arranged to extend in laterally opposed directions from one end of said standard; a pair of forwardly extending rails each supported at one end by said base member; the combination with movable carriage means including spaced support plates positioned at opposite sides of said standard and extending both rearwardly and forwardly of said standard; an attachment receptacle supported by said plates at their forwardly directed portions; a thread engaging member disposed between and fastened to said plates at the rearwardly directed portions thereof; rotatable bearing members disposed between and rotatably supported by said plates and arranged for rotatable bearing contact with opposed sides of said standard; a rearwardly extending rod support member secured to said standard; a threaded elongated rod rotatably secured to said rod support member and extending substantially parallel with said standard, and said elongated rod being arranged to rotatably engage said thread engaging member; means for rotating said elongated rod to alternatively raise and lower said movable carriage means; and an invalid support comprising forwardly extending support means secured at one end to a rigid attachment adapted for releasable engagement with said receptacle and arranged for straight path movement in opposed directions parallel with said upright standard.

4. An invalid support comprising a pair of laterally spaced support arms; a cross member joining one end of said arms; upwardly directed trunnion members secured to the free ends of said arms; extensions of said support arms pivotally connected to said trunnion members and being arranged for rotative movement from an invalid prone position to an invalid sitting position; a forwardly extending U-frame including spaced arms having their free ends pivotally secured to said trunnion members above said extensions and extending in spaced parallel relationship substantially coextensive of said extensions when said extensions are in invalid prone position; a flexible mat disposed between and secured to said support arms and extensions; and a linking member joining said U-frame and said extensions to pivotally move the latter to invalid sitting position in response to pivotal rearward rotation of said U-frame to a position spaced above and in parallel relationship with said support arms; and retaining means arranged to releasably maintain said U-frame in said rearward position.

5. An invalid support comprising a pair of laterally spaced support arms; support means arranged for cantilever support of one end of said arms; extensions of said support arms pivotally connected to the free ends of said respective support arms and being arranged for rotative movement from a first invalid support position to a second invalid support position; an upwardly extending trunnion member secured to a free end of at least one of said support arms; a forwardly extending lever arm having one end pivotally attached to said trunnion member above a respective extension and extending in parallel relationship with said extension when said extension is in said first invalid support position; foldable invalid support means disposed between and secured to said support arms and said extensions; and a link member pivotally attached at opposite ends thereof to said lever arm and to said respective extension to pivotally move the latter to said second invalid support position in response to pivotal rearward rotation of said lever arm to a position substantially parallel with a respective one of said support arms; and retaining means for releasably mounting said lever arm in said rearward position.

6. In an invalid handling device comprising an upright standard; a base member arranged to extend in laterally opposed directions from one end of said standard; a pair of forwardly extending rails each supported at one end by said base member; the combination with invalid support means including laterally spaced forwardly extending support arms each arranged to be releasably secured at one end thereof to said upright standard; extensions of said support arms pivotally connected to the free ends of said respective support arms and being arranged for rotative movement from a first invalid support position to a second invalid support position; an upwardly extending trunnion member secured to a free end of at least one of said support arms; a forwardly extending lever arm having one end pivotally attached to said trunnion member above a respective extension and extending in parallel relationship with said extension when said extension is in said first invalid support position; foldable invalid support means dsposed between and secured to said support arms and said extensions; and a link member pivotally attached at opposite ends thereof to said lever arm and to said respective extension to pivotally move the latter to said second invalid support position in response to pivotal rearward rotation of said lever arm to a position substantially parallel with a respective one of said support arms; and retaining means for releasably mounting said lever arm in said rearward position.

References Cited in the file of this patent

UNITED STATES PATENTS

| | | |
|---|---|---|
| 9,413 | Wiswell | Nov. 16, 1852 |
| 802,728 | Amos | Oct. 24, 1905 |
| 1,090,248 | Toepfer | Mar. 17, 1914 |
| 2,187,283 | Scheutz | Jan. 16, 1940 |
| 2,287,955 | Zunino | June 30, 1942 |
| 2,375,907 | Farmer | May 15, 1945 |
| 2,539,346 | Feist | Jan. 23, 1951 |
| 2,595,651 | Feist | May 6, 1952 |
| 2,681,455 | Schwartz | June 22, 1954 |
| 2,783,824 | Rechler | Mar. 5, 1957 |
| 2,821,406 | Hoyer | Jan. 28, 1958 |

FOREIGN PATENTS

| | | |
|---|---|---|
| 106,540 | France | Jan. 23, 1875 |
| 363,031 | Germany | Nov. 3, 1922 |